April 17, 1956 M. SALWASSER 2,742,152
CHECK WEIGHER
Filed April 18, 1950 5 Sheets-Sheet 1

INVENTOR.
MELVIN SALWASSER
BY
Boyken, Mohler & Beckley.
ATTORNEYS

April 17, 1956  M. SALWASSER  2,742,152
CHECK WEIGHER

Filed April 18, 1950  5 Sheets-Sheet 2

INVENTOR.
MELVIN SALWASSER
BY
Boyken, Mokler & Beckley
ATTORNEYS

April 17, 1956
M. SALWASSER
2,742,152
CHECK WEIGHER
Filed April 18, 1950
5 Sheets-Sheet 4
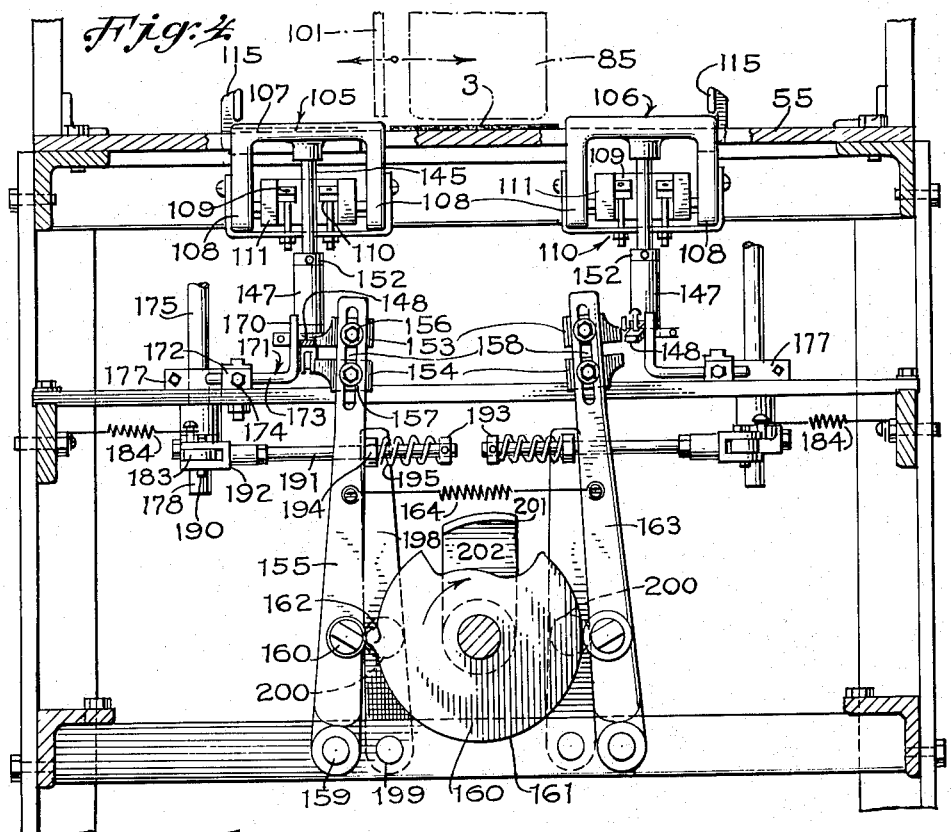
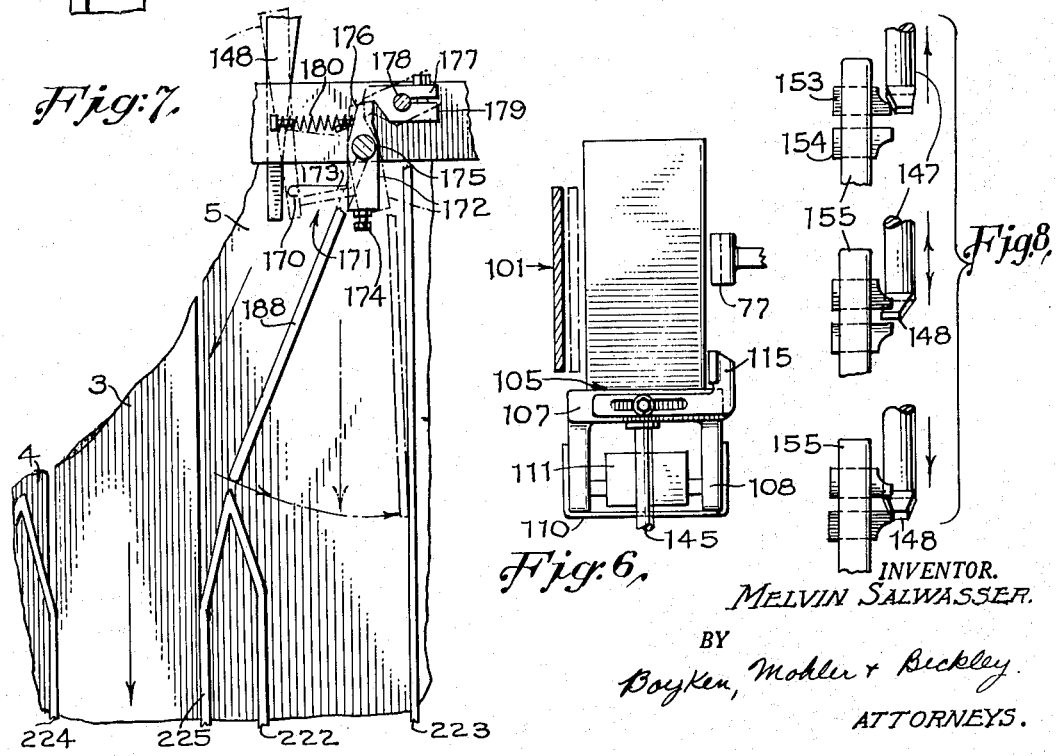
INVENTOR.
MELVIN SALWASSER.
BY
Boyken, Mohler + Beckley
ATTORNEYS.

April 17, 1956 M. SALWASSER 2,742,152
CHECK WEIGHER
Filed April 18, 1950 5 Sheets-Sheet 5

INVENTOR.
MELVIN SALWASSER
BY
Boyken, Mohler & Beckley.
ATTORNEYS

United States Patent Office 2,742,152
Patented Apr. 17, 1956

2,742,152

CHECK WEIGHER

Melvin Salwasser, Dinuba, Calif.

Application April 18, 1950, Serial No. 156,523

8 Claims. (Cl. 209—121)

This invention relates to check weighers and more particularly to a mechanical check weigher which may be employed to check the weight of packages and the like for rejecting packages over or under a predetermined weight.

Various methods have been employed in the past to insure proper weight of packaged goods and these methods vary with the product handled and the size of the plant. When accurate net weighers are employed to fill the packages random checking by weighing, say one package out of ten or one out of a hundred is sometimes considered adequate to insure uniformity in weight. The net weighers in some plants are considered so accurate that no check weighing operation is performed.

Although check weighing of each package is recognized as being the best method of insuring uniformity such a procedure has not generally been followed in the past because weighing operations have been too slow compared with the other packaging operations and would reduce the efficiency of the entire packaging operation if followed.

It is therefore the main object of this invention to provide a check weigher of much higher capacity than prior devices of like nature. The present invention has been employed successfully to check-weigh the combined output of three or four rapidly operating net weighers or about 90 packages per minute.

Another object of the invention is the provision of an entirely mechanical check-weigher which does not employ electrical or electronic devices of any nature. It is well known that electrically operated weighing devices cannot be employed under certain circumstances such as in installations subject to a great amount of shock and vibration. Electrically controlled devices do not operate well in moist or dusty atmospheres.

Still another object of the invention is the provision of a relatively simple check weigher which may be easily adjusted and kept in repair with a minimum of attention.

Other objects and advantages will be apparent from the specification and drawings wherein:

Fig. 4 is a vertical cross-sectional view through the device as taken along lines 4—4 of Figs. 1 and Fig. 4 and showing the operating mechanism for the tolerance bar.

Fig. 6 is an enlarged side elevational view of the balance scale platform and its associated mechanism.

Fig. 7 is an enlarged plan view of a portion of the device.

Fig. 8 is a fragmentary schematic view showing various positions of the tolerance arm with respect to the scale arm.

The present invention is adapted to be installed within the normal path of travel of the packages after they have been filled by the net weighers or manually or by whatever operation is employed.

Figure 1:
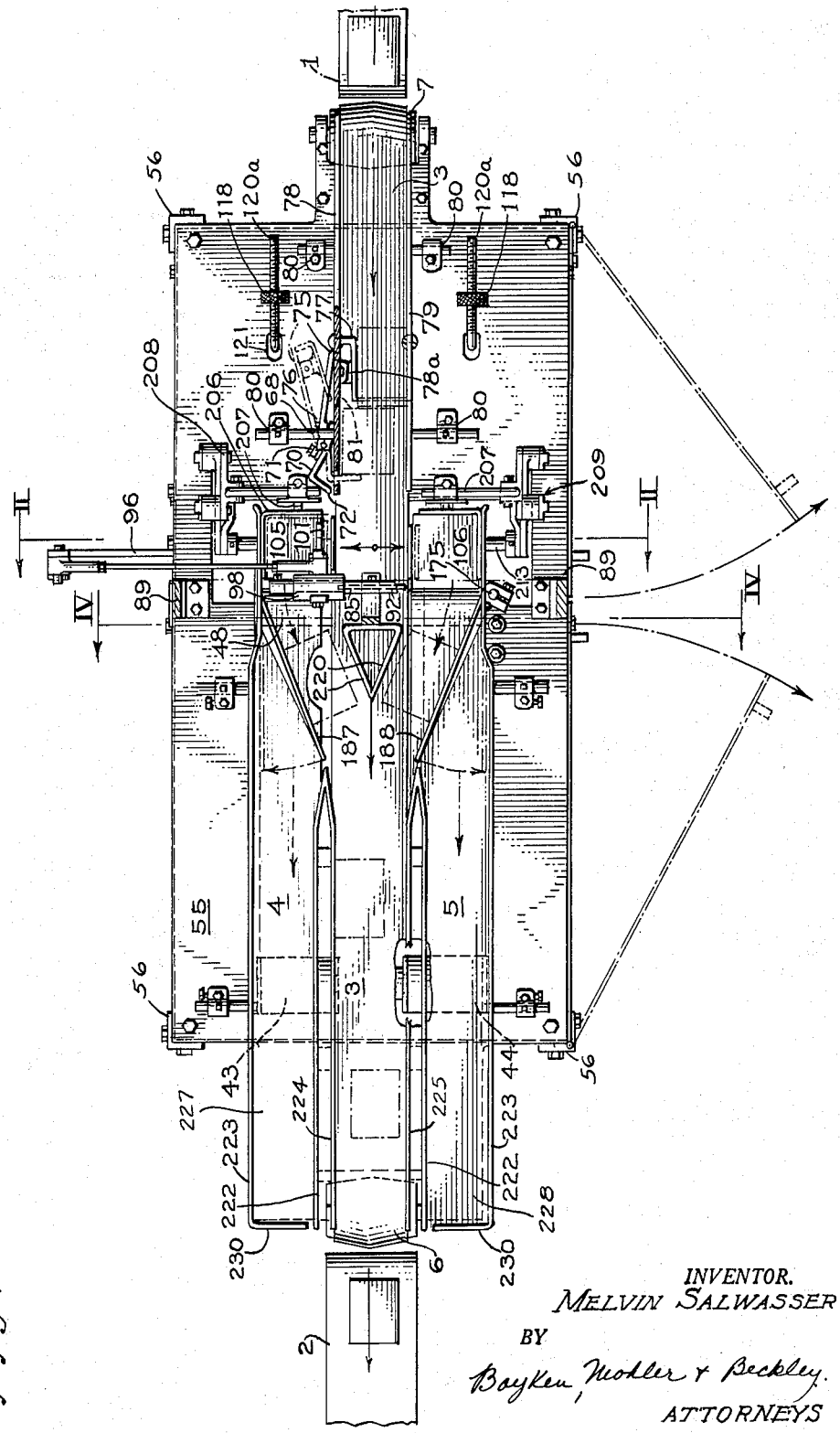
Fig. 1 is a reduced top plan view of the check weigher positioned between two conveyors.

Thus a belt 1 (a portion of which is shown in Fig. 1) is adapted to carry the package to the check weigher and a take off belt 2 (also partially shown in Fig. 1) is adapted to remove correct weight packages after the same have been checked by the weigher.

The invention comprises a central belt 3 which is positioned in horizontal alignment with the belts 1 and 2 and which carries packages or cartons coming from belt 1 to the weight checker and which also serves to carry correct weight packages to the take-off belt 2 after such packages have passed the checker. Belt 3 also received rejected packages which have been corrected in weight by removal or addition or material to the package by an operator.

Side belts 4 and 5 (Fig. 1) are positioned in side by side relationship to the central belt 3 for receiving rejected packages from the weigher. These belts 4, 5 extend from a point adjacent the discharge end of the machine to a point about centrally between the ends of the upper run of central belt 3.

Figure 3:
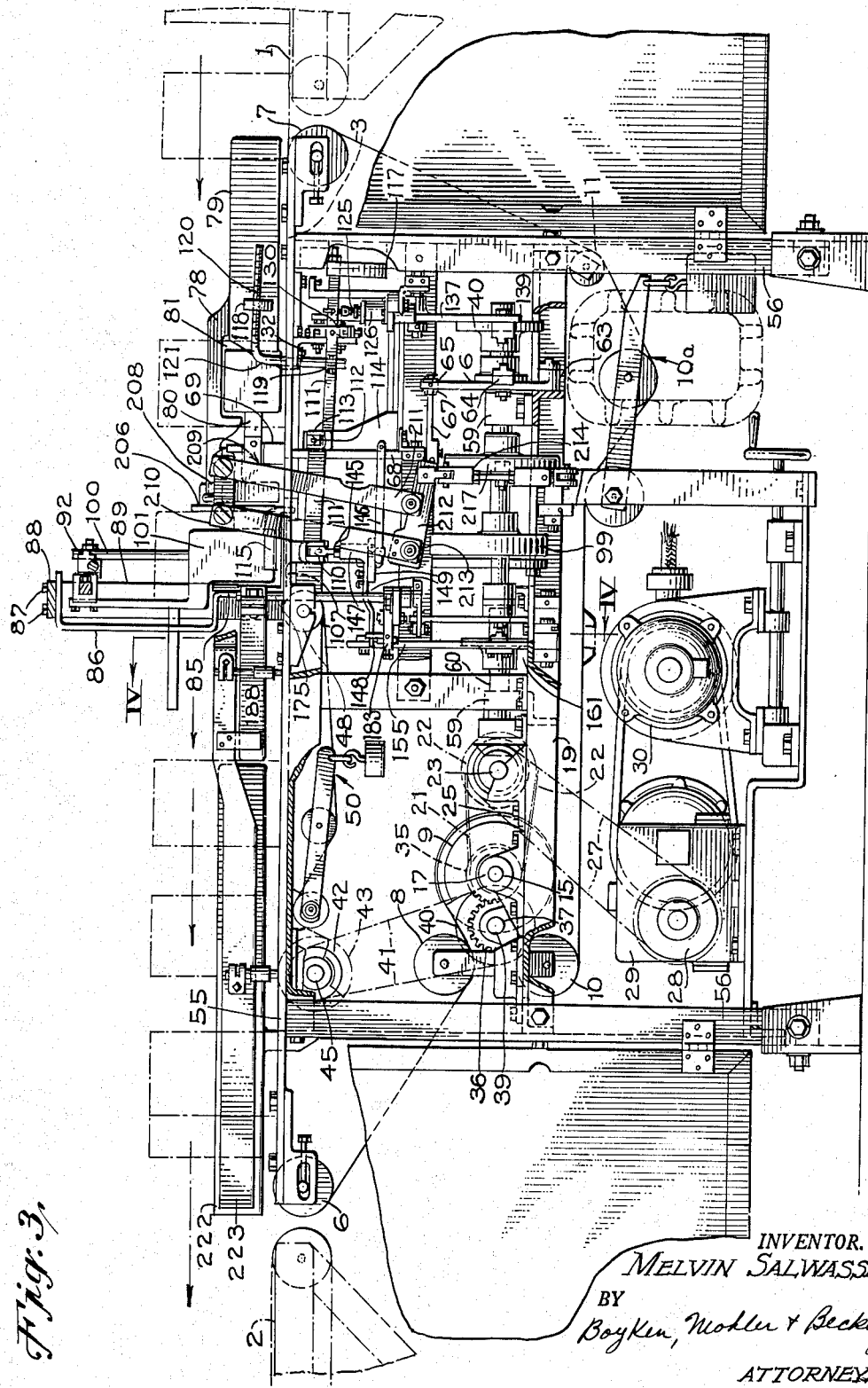
Fig. 3 is a side elevational view of the device with some portions broken away for clarity.

As best seen in Figs. 1 and 3, pulleys 6, 7 are adapted to engage the belt 3 at the ends of the top run. Pulley 6 being positioned at the end adjacent the take off belt 2 while pulley 7 is positioned at the end adjacent approach belt 1.

The belt 3 passes slantingly downwardly and inwardly of the machine at the end adjacent take-off belt 2 to an idler pulley 8 (Fig. 3) and then slantingly upwardly and around a drive pulley 9, thence around another idler pulley 10 which is directly under idler 8. The belt 3 then extends horizontally to a conventional tensioning device generally designated 10a and then around an idler pulley 11 to the pulley 7.

Figure 5:
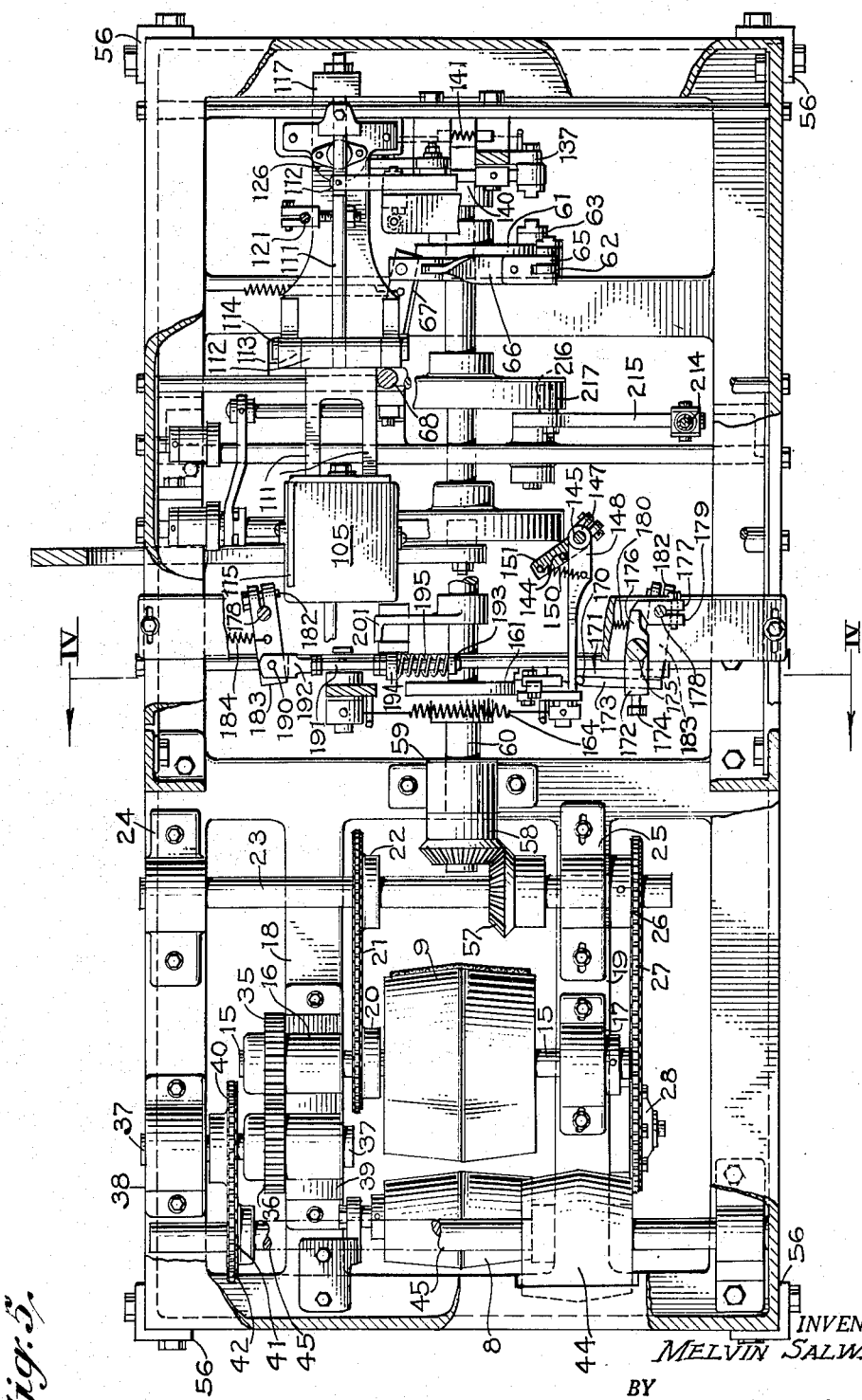
Fig. 5 is a top plan view of the device with the belts removed and showing the operating mechanisms and drive units.

As best seen in Fig. 5 the drive pulley 9 is supported on a horizontal shaft 15 which extends transversely of the machine and is rotatably supported in bearings 16, 17 which in turn are secured to supports 18, 19 respectively (Fig. 5). These supports 18, 19 may be rigidly secured to the frame of the machine.

Fastened to shaft 15 intermediate bearing 16 and pulley 9 is a sprocket wheel 20 which is driven through chain 21 from a sprocket 22 on a shaft 23. This shaft 23 is parallel with shaft 15 and is supported for rotation in bearings 24, 25.

The end of shaft 23 which is adjacent the bearing 25 carries another sprocket wheel 26 which is driven by chain 27 from sprocket wheel 28 on the output shaft of a reducer 29, Fig. 3. The reducer 29 is driven by motor 30 in any conventional manner.

One end of the drive pulley shaft 15 is provided with a spur gear 35 which drives a similar gear 36 mounted on a relatively short shaft 37. Shaft 37 is rotatably mounted in bearings 38, 39 and carries a sprocket wheel 40 for driving chain 41. Chain 41 extends slantingly upwardly from the sprocket 40 (Fig. 3) and engages a sprocket wheel 42 secured to drive pulley 43 which drives the side belt 4. This drive pulley 43 and sprocket wheel 42 are fastened to shaft 45 adjacent one end of the latter. Shaft 45 extends transversely of the machine and carries at its other end drive pulley 44 for driving side belt 5 (Fig. 1).

Idler pulleys 48, 49 respectively receive the ends of belts 4, 5 which are adjacent the center of the machine (Fig. 3) and conventional tensioning devices generally designated 50 co-act with the lower runs of the side belts 4, 5 to permit adjustable tensioning of the belts as desired.

Thus it is seen that three belts 3, 4, 5 are driven from a single motor and may be made to run at different speeds if desired by proportioning the number of teeth in sprocket wheels 40, 42 as desired.

The supporting structure of the weighing device comprises a horizontal generally rectangular top plate 55 (Fig. 1) on which the top runs of the belts 3, 4 are adapted to slide while the machine is in operation. This top plate 55 is cut away as desired to permit passing the various elements of the mechanism through said top and to permit movement of the belts around the pulleys therein before described. Uprights 56 are positioned at each of the four corners of the top 55 and suitable cross members and supports may be provided as desired to support the operating mechanism.

Referring again to Fig. 5, the shaft 23, hereinbefore described, is provided with a bevel gear 57 which is adapted to engage a similar bevel gear 58 on a horizontal shaft 60. This shaft 60 extends longitudinally of the machine and is spaced downwardly from the central belt 3 and is rotatably supported in bearings 59.

This shaft 60 is the means for driving all of the mechanisms required for the weighing operating and is driven at a uniform speed which is directly proportional to the speed of the belt 3 as may be seen in Fig. 5. Thus a change in the speed of the belt 3 will result in a corresponding change in the speed of the shaft 60 and the mechanisms which shaft 60 operates.

Periodic feeder

Spaced along the shaft 60 a substantial distance from bevel gear 58 is a radial cam 61 (Fig. 5) which actuates the feeder for feeding the packages along the belt 3 intermittently for a purpose which will subsequently be described later on in detail.

Figure 2:
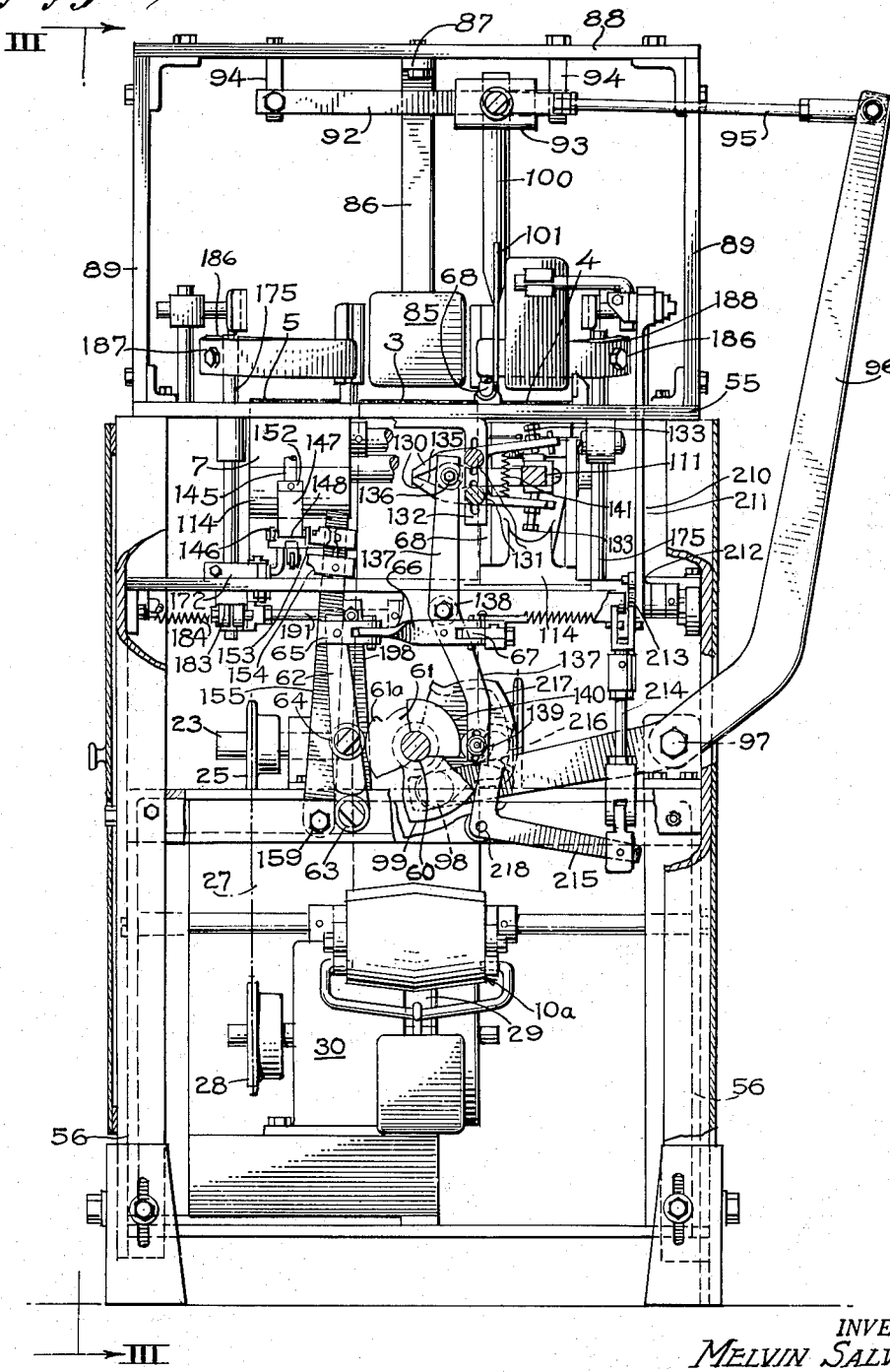
Fig. 2 is a vertical cross-sectional view through the device as taken along lines 2—2 of Fig. 1 and showing the operating mechanism for the carton feeder, scale beam centering device and the weighed carton ejector.

As best seen in Fig. 2 the cam 61 is generally circular but is provided with a pair of rises 61a spaced 180° apart around the periphery of the cam. A generally vertically extending lever 62 pivoted at its lower end to the frame as at 63 is adapted to be actuated periodically by the cam 61. This lever 62 is provided intermediate its ends with a roller 64 which is in engagement with the cam 61 at all times for swinging the lever 62 about its pivot as determined by the rises on cam 61.

Fastened to the upper end of the lever 62 is a clevis 65 which in turn is connected to one end of a horizontal link 66 extending in a direction transversely of the machine. This link 66 is connected at its other end to a horizontally disposed crank arm 67 (Fig. 3) for swinging said crank arm in a horizontal plane upon swinging of the lever 62 as above described.

The crank 67 is rigidly secured to the lower end of a vertically extending shaft 68 (Fig. 3) which passes through the top plate 55 and is journalled in bearing 69 secured to said plate.

This vertically extending shaft 68 carries a release arm 70 which is secured to the shaft 68 by means of an adjustable collar portion carrying a set screw 71. Upon swinging of the lever 62 the release arm 70 is swung in a horizontal plane by the rotation of shaft 68. The release arm 70 is provided with a package engaging portion 72 which is bent at right angles to the remainder portion of arm 70. This portion 72 is adapted to swing into and out of the path of travel of the packages as the latter are moved along the belt 3 so as to prevent further forward movement of any package with the belt 3 while the portion 72 is in the path of travel of the packages.

Also secured to shaft 68 is a second arm 75 which may also be adjustably secured to the shaft 68 as by set screw 76. The free end of arm 75 is provided with a vertically disposed plate 77 which is adjustably secured as at 78a to the arm 75 (Fig. 1). Upon rotation of shaft 68, the plate 77 will be swung into and out of frictional engagement with the sidewalls of the cartons which are on belt 3. As best seen in Figs. 1 and 3, a pair of guides 78, 79 are disposed in vertical planes alongside the belt 3 and are respectively substantially coplanar with the longitudinally extending edges of the belt 3. These guides 78, 79 are disposed in vertical planes alongside the belt 3 and are respectively substantially coplanar with the longitudinally extending edges of the belt 3. These guides 78, 79 are spaced upwardly clear of the belt 3 and are mounted to the top plate 55 by means of suitable supports 80. Guide 78 which is on the same side of the belt 3 as shaft 68 is provided with a generally rectangular opening 81 (Fig. 3) to permit movement of the plate 77 into and out of the path of travel of the packages.

When the plate 77 is swung against the packages in belt 3 the latter will be forced against the guide 79 to frictionally hold the packages against movement with the belt 3. This action is illustrated in Fig. 1 where the packages are shown in dotted line. It should be noted at this point that the elements 72 and 77 which engage the packages are designed to coact with rectangular packages or cartons such as the type in which raisins are packed. It will be apparent that minor changes in design will permit use of the devices with packages of other shapes and even with cylindrical cans if desired.

The action of the above described elements is to arrest forward movement of all of the packages on the belt 3 except one and to permit that one package to move forwardly only at a predetermined point in the rotation of shaft 60. Thus plate 77 arrests the forward movement of all of the packages except the one engaged by element 72 and the element 72 feeds the packages forwardly along the belt 3 intermittently at predetermined intervals of time. Of course, if the speed of shaft 60 is changed the said intervals of time will be changed; this is necessary for the proper functioning of the machine as will subsequently be apparent.

Diverting means

Upon being released by the element 72, the package will be stopped by a vertically disposed plate 85 (Fig. 2) which is stationarily secured above the belt 3 so as to prevent further forward movement of the packages along the belt 3. This plate 85 is secured to the lower end of a generally vertically extending support arm 86 which in turn is secured at its upper end by suitable fastening means 87 to a horizontal frame member 88. This frame member 88 extends transversely of the machine and is spaced above the top plate 55 by a pair of uprights 89 which are respectively secured at their lower ends to top plate 55 adjacent the longitudinally extending side edges of the latter (Fig. 2). When the package is thus stopped by the stop plate 85 a diverter mechanism is employed to divert each package from the path of travel defined by belt 3 and onto the platforms of a pair of balance scales. This diverter mechanism will now be described in detail.

Spaced downwardly from the horizontal frame member 88 is an elongated, horizontal guide member 92 which is adapted to receive a cross-head 93 for longitudinal movement of the latter transversely of the machine. The guide 92 is fastened at each of its ends to the lower ends of spacers 94 which in turn are fastened at their upper ends to frame member 88. Pivotally secured to the cross-head 93 is a generally horizontally disposed link 95 which is pivotally secured at its other end to a generally vertically extending actuating arm 96 which is bent intermediate its ends as shown in Fig. 2 to permit the lower end of said arm to extend generally horizontally toward the center of the machine. A pivot 97 is provided at one side of the machine frame for supporting said arm 96 for rocking movement in a vertical plane. The inner lower end of the arm 96 carries a roller 98 which is adapted to be received in a groove formed in one side of a face cam 99. The face cam 99 is fastened to shaft 60 for rotation therewith and its groove is formed so as to cause the cross-head 93 to reciprocate transversely of the machine with a travel slightly greater than the width of the belt 3.

Depending downwardly from the cross-head 93 is a vertical arm 100 which is rigid with said cross-head and which carries at its lower end a diverter plane 101 for engaging the package which has been stopped by the stop plate 85. This diverter plate 101 is at all times disposed in a vertical plane parallel with the longitudinal axis of the shaft 60 and belt 3. However, this diverter is moved back and forth, by the action of the cam 99, across the face of the stop plate 85 which engages the packages after the latter have been released by the element 72. Thus, upon movement of the diverter plate 101 to the left as seen in Fig. 2, the carton which is against the stop plate 85 will be pushed off the belt 3 to the left and upon the return stroke of the diverter plate 101 the next package which has been released by the element 72 will be pushed off the belt 3 to the right.

It should be noted in this connection that the plate 101 will go through one cycle during one revolution of the shaft 60 while the feeder device 70 will go through two cycles during this time. Thus two packages will be released to plate 85 during one cycle of the diverter plate 101 and both of these packages will be diverted from the belt 3 in one revolution of the shaft 60. Of course, the face cam 99 and the cam 61 must be relatively positioned so that one package will not be released by element 72 until the next preceding package has been moved transversely of the belt a sufficient distance to permit the one package to strike the stop plate 85 to await the diverter plate 101 moving back on its return stroke.

*Balance scales*

Each package engaged by the diverter plate 101 is pushed onto one or the other of a pair of scale platforms 105, 106 (Fig. 1) depending upon the direction in which the diverter plate 101 is moving when said package is engaged. As best seen in Fig. 1 the platform 105 is positioned on the same side of belt 3 as the side belt 4 while the scale platform 106 is positioned on the opposite side along with side belt 5.

Inasmuch as the construction of both scales is identical, only the one having the platform 105 will be described in detail. This platform 105 comprises a generally rectangular top portion 107 (Fig. 4), and a pair of downwardly extending ears 108 integral with said top for carrying the blocks 109 for receiving the knife edges 110 secured to the scale beam 111. This beam 111 is provided intermediate its ends with knife edges 112 (Figs. 3, 5) by which the beam 111 is supported on blocks 113 secured to the stationary pedestal 114.

Removably secured to the end of the beam which is remote from the platform 105 is a weight 117 which partially balances the weight of the carton on the platform 105. This weight may be replaced with another to suit the weight of the package to be weighed. An adjustable weight 118 (Fig. 3) is provided on an extension arm which is secured to the beam 111 as by screw 119. This extension arm comprises a horizontal threaded portion 120 for receiving a corresponding threaded aperture in the weight 118 and a generally vertical portion 121 at right angles to portion 120. This portion 121 which is secured at its lower end to beam 111 extends through a suitable opening in the top plate 55 of the machine so that the weight may be adjusted along the length of the portion 120 from above the top plate 55; it being understood that the remainder of the scale is concealed under the top 55.

Adjacent the weight 117 and depending from the beam 111 is a relatively small rod 125 which is secured at its lower end to the piston rod of a relatively light dash-pot 126 which is stationarily secured with respect to the beam 111 to the frame of the machine. This dash-pot partially resists the shock on the beam 111 from the sudden application of the weight of the package on the platform 105 and improves the speed of the check weigher in a manner which will subsequently be described in greater detail.

*Balance beam centering device*

To increase the speed of the weighing operation I provide a means for centering the beam 111 at a predetermined inclination at the moment a package is received by the platform. This predetermined inclination is that which results when the weight of the package is exactly equal to the nominal weight of the package. In this connection it should be noted that the range within which the weight of the package should come generally has a lower limit equal to the exact nominal weight of the package and an upper limit of say ⅛ or ¼ ounce above said exact weight when such exact weight is in the order of a pound or two. Regardless of the tolerance employed, the beam should be centered at an inclination corresponding to the exact weight of the package.

As best seen in Fig. 2 the centering means for the beam 111 comprises a pair of identical levers 130 which are positioned one above the other and pivotally secured intermediate their ends as by bolts 131 to a bracket 132 which in turn is secured to the underside of the top plate 55. The levers 130 extend from the pivots 131 to points respectively above and below the beam 111 and are provided at their corresponding ends with adjusting screws 133 which are adapted to engage the upper and lower sides of the beam 111 respectively at a point adjacent the dash-pot 126.

The ends of the levers 130 which are remote from the beam 111 are provided with generally concave opposed cam surfaces 135 with taper generally toward each other in a direction away from the pivots 131. A roller 136 is adapted to be received between the two surfaces 135 for movement along said surfaces in a direction transversely of the machine. This roller 136 is secured to the upper end of a generally vertically extending arm 137 which is pivotally secured at a point intermediate its ends to the frame of the machine as by bolt 138. The lower end of the arm 137 is provided with a roller 139 which is adapted to engage the periphery of a radial cam 140 fastened on shaft 60. From Fig. 2 it will be apparent that by providing a suitable rise on cam 140 the arm 137 will be made to rock on each revolution of the shaft 60 for moving the roller 136 generally horizontally between the cam surfaces 135 of the levers 130. This motion by the roller 136 to the left as seen in Fig. 2 will cause the opposite ends of the levers 130 to swing into engagement with the beam 111 and securely hold the same stationary during the time the roller 139 is on the rise of the cam 140.

In operation the cam 140 is timed with the cam 99 so that the beam 111 is centered at the time the cam 99 causes the diverter plate 101 to push a package from the belt 3 onto the platform 105. The beam 111 is released by the levers 130 at the moment the diverter plate 101 is free from the package diverted.

The platform 105 is provided with an upwardly extending flange 115 (Fig. 4) along the edge of the platform which is remote from the belt 3. This flange 115 engages the package as it is positioned on the platform 105 and prevents the package from falling off the platform under the influence of the diverter plate 101. A compression spring 141 may be secured at its ends to the levers 130 as shown in Fig. 2 to urge the beam engaging portions of the levers away from each other at all times so as not to interfere with the beam 111 during weighings.

*Tolerance arm and mechanism*

Extending downwardly from the center of the underside of the top portion 107 of the platform 105 is a vertical shaft 145 (Fig. 4) which moves up and down with the platform 105 depending upon the weight of the package to be weighed. This shaft 145 is pivotally secured at its lower end to one end of a generally horizontally extending link 146 (Fig. 3) which is pivotally secured at its other end to the scale pedestal 114 so that it is parallel with the portion of the beam 111 between the pedestal 114 and the platform 105. Thus it is seen that the shaft 145 becomes a link in a parallelogram linkage and remains vertical at all times during vertical movement of the same. Spaced upwardly from the lower end of the shaft 145 is a sleeve 147 (Figs. 2, 3, 4) which is rotatable on the shaft 145. This sleeve carries a rigid arm 148 extending generally horizontally away from the shaft 145 in the direction of flow of the cartons, as best seen in Fig. 5. The sleeve 147 is supported on another arm 151 which is rigidly secured to the shaft 145 and which carries at its free end a light tension spring 150 which extends between said arm 151 and arm 148 as shown in Fig. 5. Upward movement of the sleeve 145 is prevented by collar 152 (Fig. 4). The arms 151 and 148 are angularly disposed with respect to shaft 145 so that the movable arm 148 will be urged towards the fixed arm 151 at all times. A stop 144, which may be a small pin, is secured to the fixed arm 151 to prevent clockwise movement (Fig. 5) of the arm 148 beyond a predetermined limit.

As best seen in Figs. 4 and 8, the horizontal arm 148 is adapted to register with the opening between a pair of vertically spaced jaws 153, 154 which are secured to the upper end of a generally vertically extending arm 155. These jaws 153, 154 are secured to the arm 155 by bolts 156, 157 respectively which bolts are adapted to pass through an elongated slot 158 in the arm 155 for adjusting the spacing between the jaws 153, 154 as desired. The lower end of the arm 155 is pivotally secured to the frame of the machine as at 159 and is provided intermediate its ends with a roller 160 which is adapted to engage the periphery of a radial cam 161 fastened to shaft 60. This cam 161 is provided with a rise 162 which is adapted to engage the roller 160 for swinging the jaws 153, 154 toward the arm 148. The arm 163 which corresponds with the platform 106 is also shown in Fig. 4 and it will be apparent that each of the arms 155, 163 will be swung outwardly away from the center of the machine once for each revolution of the shaft 60. Furthermore, the arms 155, 163 will operate 180° out of phase with respect to each other. This is because the scale platforms 105, 106 receive a package at intervals equal to ½ a rotation of shaft 60.

It should be noted that the rise 162 is relatively short in a direction circumferentially of the cam 161 so that the swinging movement of the arm 155 is abrupt. Thus if one of the jaws 153, 154 is in a position to engage the arm 148, the latter will be struck with considerable impact. A tension spring 164 extends between the arms 155, 163 as shown in Fig. 4 for urging said arms toward the center of the machine at all times.

As best seen in Fig. 4 the vertical position of the arm 148 relative to the jaws 153, 154 will be determined by the position of the platform 105 since said arm is carried by the platform and in the same vertically spaced relationship with the platform at all times. The positioning of jaws 153, 154 on the arm 155 is such that the upper jaw will just clear the arm 148 when the package on the platform 105 is exactly the minimum weight desired. In like manner the lower jaw will just clear the arm 148 when the weight of the package is overweight by the desired tolerance, say ⅛ ounce for a pound package. The rise 162 on the cam 161 is of course positioned relative to the rise on cam 140 so that the arm 155 will swing a short interval of time after the beam 11 has been released by the levers 130. This short interval of time is of course not the time required for the beam to come to rest. To permit the platform 105 to receive about 45 packages per minute (i. e. 90 total for both scales) it is necessary to swing the arm 155 before the beam 111 has come to rest and while the arm 151 is moving (assuming a package being weighed which is not exact weight). Thus the upper jaw 153 is pre-set so that upon even a slight movement of the beam upwardly (when the package is light) the arm 148 will be struck by the jaw 153 thus swinging said arm outwardly away from the center of the machine. Upon downward movement of the arm 148 (when the package is heavy) the same will be struck by jaw 154 if the movement in the above mentioned interval causes the arm 148 to move out of registration with the space between the jaws 153, 154 and into registration with the jaw 154.

The arms 155, 163 which carry the jaws 153, 154 may be considered as tolerance members or arms because the spacing of the jaws 153, 154 indicates the tolerance or permissible variation in weight of the packages. The arm 148 which is adapted to be engaged by the jaws 153, 154 of the tolerance arm is in effect an indicator, the position of which indicates whether the article weighed is within the permissible range of weights. The novel cooperation between the tolerance jaws 153, 154 and the indicator arm 148 as herein described permits an extremely accurate selection of "off-weight" articles.

Although the cams on shaft 60 should preferably be arranged to make the above mentioned time interval as long as possible it should be understood that the arm 151 need not necessarily come to rest since, in the case of a very heavy or very light article, the scale platform will be moving when the arm 155 is actuated. It will be apparent that as much accuracy may be achieved by measuring the movement of the beam 111 in a given interval of time as by waiting for the beam to come to rest. In this connection, the dash-pot 126 slows up the movement of the beam 111 so that it will travel a certain predetermined distance in a predetermined length of time under a predetermined weight regardless of slight shock effects.

If the weight of the package is outside of the predetermined range the arm 148 will be swung with the sleeve 147 about the shaft 145 when struck by one of the jaws 153, 154. Upon such the swinging of arm 148, it will engage the vertically extending portion 170 of a rod 171 (Fig. 4) which in turn is secured to one end of a detent 172. The rod 171 is formed with a horizontal portion 173 at right angles to the vertical portion 170 and this horizontal portion is received in a suitable aperture in the end of the detent 172 and removably and adjustably secured to said detent by a set screw 174.

The detent 172 is pivotally secured intermediate its ends to the frame of the machine as by bolt 175 (Fig. 5) and is formed with a tooth portion 176 at its opposite end to engage a corresponding tooth portion of a ratchet member 177 which is secured to a vertically extending shaft 178 by a clamp portion 179. The detent 172 is engaged by a compression spring 180 for urging the toothed end of said detent into engagement with the ratchet portion 177 at all times to prevent counterclockwise movement of the ratchet member as seen in Fig. 5.

Spaced downwardly from the ratchet member 177 and also secured to the shaft 178 as by clamp 182 (Fig. 5) is a horizontally disposed lever 183. To the free end of this lever 183 is secured one end of a tension spring 184 which extends between the said lever and the frame of the machine (Figs. 4, 5). This spring urges the ratchet member, shown in Fig. 5, counterclockwise against the resistance of the detent 172. Thus when the detent 172 is swung out of engagement with the ratchet member 177 the shaft 178 will be rotated counterclockwise under the influence of spring 184. The shaft 178 extends upwardly through the top plate 55 of the machine and carries at its upper end the clamping end 186 of a gate 187. This gate 187 comprises an elongated rectangular portion which is adapted to extend slantingly across the end of belt 4 which is adjacent the center of the machine (Figs. 1, 7). This gate is normally positioned across the belt 4 but upon release of detent 172 the gate will swing alongside the outer longitudinally extending edge of the belt 4. The gate 188 which corresponds with the side belt 5 and the scale platform 106 is shown in dotted line in this latter position in Fig. 7.

Upon ejection of the carton from the platforms 105 and 106 in the same direction as the packages are traveling on belt 3 the gate 188 will be open as shown to permit a rejected package to be received by belt 5. If the package is of correct weight the gate will be in the position of Fig. 1 and will deflect the correct weight package in a direction inwardly of the machine to be received by the belt 3.

Thus when the tolerance arm jaws 153, 154 strike the arm 151 (in the case of a rejected package) the rod 171 will move horizontally outwardly to swing the detent 172 out of engagement with the ratchet member 177. The released shaft 178 will then swing under the influence of the tension spring 184 for moving the gate to the reject position to permit the rejected package to pass on to belt 4.

Immediately after a rejected package has passed the gate 187 the ratchet member 177 must be returned to its set position before the next package is weighed. The mechanism for resetting the ratchet member will now be described.

The lever 183 to which is secured the tension spring 184 for actuating the gate is also provided, adjacent its free end, with a pivot such as bolt 190 which connects said lever to one end of a horizontally extending link 191 (Fig. 4). This link 191 extends inwardly of the machine and is provided at its outer end with a clevis 192 for receiving the free end of the lever 183 and at its other end with a fixed collar 193. Another collar 194 is slidably supported on the link 191 intermediate its ends and is secured to one end of an extension spring 195 which surrounds the link 191 and which is fastened at its other end to the fixed collar 193. The movable collar 194 is secured to the upper end of a vertically extending arm 198 which is pivoted at its lower end as at 199 to the frame of the machine in a similar manner as arm 155 and which is provided intermediate its ends with a roller 200. This roller 200 is adapted to be engaged by the flange 201 of a cam 202 secured to shaft 60.

Referring to Fig. 4 it will be seen that upon rotation of the cam 202 the flange 201 will engage the roller 200 and swing the arm 198 in a direction toward the center of the machine thus moving the collar 194 against the spring 195 and yieldably urging the link 191 horizontally inwardly of the machine. This movement of the link 191 causes the lever 138 to swing in a horizontal plane against the resistance of spring 184 together with the vertical shaft 178 to which said lever is secured. This rotation of the shaft 178 is sufficient to cause the ratchet member 177 to again be engaged by the detent 172 (Fig. 5) thus setting the gate 187 in its normally closed position. The cam 202 is positioned in relation to the weighing mechanism so that the gate 186 is closed before the arm 155 is engaged by the cam 161.

*Ejector mechanism for weighed packages*

The package ejector mechanism for removing the weighed packages from the platforms 105, 106 is best seen in Fig. 3 wherein the ejector for the platform 106 is shown. The package which has been weighed on platform 106 is engaged by a vertically disposed plate 206 (Fig. 1) which is adapted to move over the platform 206 for transferring the package to the side belt 5. A similar ejector plate is positioned adjacent the platform 105 for the same purpose. The plate 206 is secured to a horizontally disposed arm 207 which in turn is fastened to a generally horizontal link 208 which link constitutes the upper link in a vertical parallelogram linkage generally designated 209 which may be actuated for moving the plate 201 longitudinally of the belt 5.

This parallelogram linkage 209 comprises two generally vertically disposed parallel links 210, 211 which are pivotally secured at their lower ends to a lower link 212 which is parallel to link 208. The pivot 213 on the lower end of the link 210 also secured the parallelogram to the frame. The lower link 212 is provided with a rigid extension for receiving the upper end of a vertically extending link 214. This link 214 is pivotally connected at its lower end to one arm of a bell crank 215 (Fig. 2) which is pivoted as at 218 to the frame of the machine. The other arm of the bell crank 215 carries a roller 216 which is adapted to be received in the groove of a face cam 217 mounted on the shaft 60. The groove of the cam 217 is designed to cause the link 214 to move downwardly at a point in the rotation of the shaft which corresponds to the swinging of the tolerance arm 155. Thus the ejector plate 201 will move the package toward the side belt 5 (in the case of a rejected package) immediately after the gate 188 swings open. This will result in a rejected package being received by the reject belt 5 and moved longitudinally therealong. In the case of a package within the desired range the gate 188 will remain closed and the package will be deflected onto the central belt 3 partly by the action of the belt 5 and partly by the belt 3; both belts moving in the same direction.

To facilitate movement of a passed package onto the central belt 3, I provide a pair of angularly disposed guides 220 which converge in a direction rearwardly of the machine or in the direction in which the cartons are moving (Fig. 1). These guides may be secured to the stop plate 85 which has been previously described.

Suitable guides 222, 223 may be positioned along opposite sides of the side belts 4, and 5 (Fig. 1) for laterally supporting the rejected packages. Also guides 224, 225 may be positioned alongside the central belt 3 for the same purpose. The inner guides 222 of the side belts 4 and 5 and the guides 224, 225 are preferably formed with their ends adjacent the free end of the gates 187, 188 converging in a direction forwardly of the machine or in the direction from which the packages are approaching.

Extensions 227 and 228 of the top plate 55 of the machine are preferably provided in alignment with the belts 4 and 5 respectively for receiving rejected packages from the belts 4 and 5. The guides 223 may be formed with inwardly extending portions 230 for limiting rearward movement of the rejected packages.

From the above description it will be apparent that an operator may stand alongside each of the reject belts 4 and 5 and remove packages therefrom and check the same on a conventional balance scale (not shown) and then replace the package, after its weight has been corrected, on the central scale 3 which will carry it onto the take-off belt 2 to the next operation.

The operation of the machine may be summarized as follows, primarily with reference to Fig. 1. The packages are received from belt 1 from the net weighers or other filling devices. The packages then move along the belt 3 between the guides 78, 79 until they are engaged by plate 77 which plate frictionally holds each package against the guide 79 until the next preceding package has been released by the release arm 70. The release arm 70 intermittently feeds the packages to the diverter mechanism at intervals of time which are determined by the speed of rotation of the driving mechanism and particularly that of the main cam shaft 60.

The packages are then diverted first to one scale platform and then to the other for weighing. After the weighing operation has been performed the package is moved rearwardly by the ejector mechanism 209 toward one of the reject belts depending upon which scale has weighed it. If the package is over or under the desired range of weights it is received by one of the reject belts 4 and 5 and if of correct weight, by the central belt 3.

The check weigher herein described has been found to give a high degree of accuracy at a rate of speed which permits its use in any plant having a relatively high output.

It is pertinent to note that the high speed attainable is partly attributable to the fact that two scales are employed on each conveyor line. Also, the centering of the platform scale beam speeds up the actual balancing of the scale which normally is the most time consuming operation.

Perhaps the most important feature insofar as the speed of the machine is concerned rests in the fact that the weight may be measured while the scale beam is moving. The positive timing of all the operating mechanisms thus makes possible a fast action at each point in the checking cycle.

I claim:

1. A weight checking device comprising a balance beam and a platform supported on said beam for vertical movement to different distances in opposite directions from a central position corresponding to the preferred weight of the article to be weighed, loading means for periodically loading said platform with articles to be weighed, centering means operatively associated with said loading means for securing said beam in said central position during loading and for releasing said beam for movement in either of said opposite directions when an article is on said platform, an indicator carried by said platform for vertical movement therewith, a tolerance member mounted for movement toward and away from said indicator, means for moving said member toward said indicator when said beam is released, spaced elements mounted on said member for respectively engaging said indicator when the weight of an article on said platform is above or below a predetermined range of weights, ejecting means operatively associated with said tolerance member for ejecting an article from said platform along a predetermined path of travel and rejecting means operatively connected with said indicator and actuated by movement thereof for deflecting an article from said path of travel when said indicator arm is engaged by one of said elements.

2. A weight checking device comprising a balance beam and a platform supported on said beam for vertical movement to different distances in opposite directions from a central position corresponding to the preferred weight of the article to be weighed, loading means for periodically loading said platform with articles to be weighed, centering means operatively associated with said loading means for securing said beam in said central position during loading and for releasing said beam for movement in either of said opposite directions when an article is on said platform, an indicator carried by said platform for vertical movement therewith, a tolerance member mounted for movement toward and away from said indicator, means for moving said member toward said indicator when said beam is released, spaced elements mounted on said member for respectively engaging said indicator when the weight of an article on said platform is above or below a predetermined range of weights, ejecting means operatively associated with said tolerance member for ejecting an article from said platform along a predetermined path of travel and rejecting means operatively connected with said indicator and actuated by movement thereof for deflecting an article from said path of travel when said indicator arm is engaged by one of said elements, said elements being spaced apart on said tolerance member a distance corresponding to a predetermined range of weights, whereby said elements will clear said indicator upon movement of said tolerance member towards said indicator when the weight of the article on said platform is within said predetermined range of weights.

3. A weight checking device comprising a balance beam and a platform supported on said beam for vertical movement to different distances in opposite directions from a central position corresponding to the preferred weight of the article to be weighed, loading means for periodically loading said platform with articles to be weighed, centering means operatively associated with said loading means for securing said beam in said central position during loading and for releasing said beam for movement in either of said opposite directions when an article is on said platform, an indicator carried by said platform for vertical movement therewith, a tolerance member mounted for movement toward and away from said indicator, means for moving said member toward said indicator when said beam is released, spaced elements mounted on said member for respectively engaging said indicator when the weight of an article on said platform is above or below a predetermined range of weights, ejecting means operatively associated with said tolerance member for ejecting an article from said platform along a predetermined path of travel and rejecting means operatively connected with said indicator and actuated by movement thereof for deflecting an article from said path of travel when said indicator arm is engaged by one of said elements, said elements being spaced apart on said tolerance member a distance corresponding to a predetermined range of weights, whereby said elements will clear said indicator upon movement of said tolerance members towards said indicator when the weight of the article on said platform is within said predetermined range of weights, said tolerance member being adapted to move toward said indicator at a predetermined interval of time after said beam has been released by said centering means irrespective of the vertical movement of said platform.

4. In combination with a conveyor for supporting articles thereon for movement along a horizontal path of travel, a weight checking device for weighing each of said articles and removing such articles from said conveyor that are above or below a predetermined range of weights, comprising: a balance beam and a platform supported on said beam for vertical movement to different distances in opposite directions from a neutral position corresponding to the preferred weight of the article to be weighed, a diverter for periodically diverting articles from said conveyor to said platform, an indicator carried by said platform for vertical movement therewith in said opposite directions, a tolerance member mounted for movement toward and away from said indicator, means for moving said member toward said indicator when an article is on said platform, a pair of spaced elements on said member for respectively engaging said indicator when the weight of the article on the platform is respectively above or below a predetermined range of weights corresponding to the spacing of said elements, an ejector for automatically ejecting an article from said platform after the same has been weighed and a deflector adjacent said conveyor for deflecting the rejected articles onto said conveyor when said elements have cleared said indicator during said movement of said member, and means actuated by movement of said indicator for swinging said deflector clear of said ejected article when said elements have engaged said indicator whereby rejected articles will be moved along a path of travel different from that of said conveyor.

5. In combination with a conveyor for supporting articles thereon for movement along a horizontal path of travel, a weight checking device for weighing each of said articles and removing such articles from said conveyor that are above or below a predetermined range of weights, comprising: a balance beam and a platform supported on said beam for vertical movement to different distances in opposite directions from a neutral position corresponding to the preferred weight of the article to be weighed, a diverter for periodically diverting articles from said conveyor to said platform, an indicator carried by said platform for vertical movement therewith in said opposite directions, a tolerance member mounted for movement toward and away from said indicator, means for moving said member toward said indicator when an article is on said platform, a pair of spaced elements on said member for respectively engaging said indicator when the weight of the article on the platform is respectively above or below a predetermined range of weights corresponding to the spacing of said elements, an ejector for automatically ejecting an article from said platform after the same has been weighed and a deflector adjacent said conveyor for deflecting the rejected articles onto said conveyor when said elements have cleared said indicator during said movement of said member, and means actuated by movement of said indicator for swinging said deflector clear of said ejected article when said elements have engaged said indicator whereby rejected articles will be moved along a path of travel different from that of said conveyor, centering means actuated in timed relation to said diverter for securing said balance beam in said neutral position while an article is being diverted from said conveyor and for releasing said beam when said article is on said platform whereby the weight of said article will be proportional to the distance moved by said platform from said intermediate position in a given interval of time.

6. In combination with a conveyor for supporting articles thereon for movement along a horizontal path of travel, a weight checking device for weighing each of said articles and removing such articles from said conveyor that are above or below a predetermined range of weights, comprising: a balance beam and a platform supported on said beam for vertical movement to different distances in opposite directions from a neutral position corresponding to the preferred weight of the article to be weighed, a diverter for periodically diverting articles from said conveyor to said platform, an indicator carried by said platform for vertical movement therewith in said opposite directions, a tolerance member mounted for movement towards and away from said indicator, means for moving said member toward said indicator when an article is on said platform, a pair of spaced elements on said member for respectively engaging said indicator when the weight of the article on the platform is respectively above or below a predetermined range of weights corresponding to the spacing of said elements, an ejector for automatically ejecting an article from said platform after the same has been weighed and a deflector adjacent said conveyor for deflecting the rejected articles onto said conveyor when said elements have cleared said indicator during said movement of said member, and means actuated by movement of said indicator for swinging said deflector clear of said ejected article when said elements have engaged said indicator whereby rejected articles will be moved along a path of travel different from that of said conveyor, said elements being releasably secured to said tolerance member for adjustable movement along the same for varying the tolerance in weight of said articles.

7. In a weight checking device, a balance beam and a platform supported on said beam for vertical movement to different distances upwardly or downwardly from a central position corresponding to the preferred weight of an article to be weighed, loading means for periodically loading said platform with articles to be weighed, centering means operatively associated with said loading means for securing said beam in said central position during loading and for releasing said beam for movement in either of said opposite directions when an article is on said platform, an indicator carried by said platform for vertical movement therewith, an elongated tolerance member pivotally supported at one end for movement of its opposite end toward or away from said indicator, means for moving said opposite end toward said indicator when said centering means is released, spaced elements mounted on said member adjacent said other end for respectively engaging said indicator when the weight of an article on said platform is above or below a predetermined range of weights, ejecting means operatively associated with said tolerance member for ejecting an article from said platform along a predetermined path of travel and rejecting means operatively connected with said indicator and actuated by movement thereof for deflecting an article from said path of travel when said indicator arm is engaged by one of said elements.

8. In a weight checking device, a balance beam and a platform supported on said beam for vertical movement to different distances upwardly or downwardly from a central position corresponding to the preferred weight of an article to be weighed, loading means for periodically loading said platform with articles to be weighed, centering means operatively associated with said loading means for securing said beam in said central position during loading and for releasing said beam for movement in either of said opposite directions when an article is on said platform, an indicator carried by said platform for vertical movement therewith, an elongated tolerance member pivotally supported at one end for movement of its opposite end toward or away from said indicator, means for moving said opposite end toward said indicator when said centering means is released, spaced elements mounted on said member adjacent said other end for respectively engaging said indicator when the weight of an article on said platform is above or below a predetermined range of weights, ejecting means operatively associated with said tolerance member for ejecting an article from said platform along a predetermined path of travel and rejecting means operatively connected with said indicator and actuated by movement thereof for deflecting an article from said path of travel when said indicator arm is engaged by one of said elements, said centering means comprising a pair of jaws movable toward each other for gripping said balance beam at opposite sides of the latter and movable away from each other for so releasing said beam.

References Cited in the file of this patent

UNITED STATES PATENTS

| Number | Name | Date |
|---|---|---|
| 1,137,936 | Waugh | May 4, 1915 |
| 1,182,221 | Seely | May 9, 1916 |
| 1,229,838 | Waugh | June 12, 1917 |
| 1,747,593 | Oates | Feb. 18, 1930 |
| 1,999,827 | Wardley | Apr. 30, 1935 |
| 2,307,695 | Mansbendel | Jan. 5, 1943 |
| 2,568,255 | Schieser | Sept. 18, 1951 |
| 2,590,704 | Howard | Mar. 25, 1952 |